(12) United States Patent
Morimoto

(10) Patent No.: US 8,849,903 B2
(45) Date of Patent: *Sep. 30, 2014

(54) SYSTEM AND METHOD FOR IDENTIFYING INDIVIDUAL USERS ACCESSING A WEB SITE

(76) Inventor: Nobuyoshi Morimoto, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/335,614

(22) Filed: Dec. 22, 2011

(65) Prior Publication Data

US 2012/0158777 A1    Jun. 21, 2012

Related U.S. Application Data

(63) Continuation of application No. 13/159,127, filed on Jun. 13, 2011, now Pat. No. 8,095,654, which is a continuation of application No. 09/588,879, filed on Jun. 6, 2000, now Pat. No. 7,962,603.

(51) Int. Cl.
*G06F 15/16* (2006.01)
*H04L 29/06* (2006.01)
*H04L 29/08* (2006.01)
*G06F 17/30* (2006.01)

(52) U.S. Cl.
CPC .......... *G06F 17/30861* (2013.01); *H04L 69/28* (2013.01); *H04L 67/04* (2013.01); *H04L 67/142* (2013.01)
USPC .......................................... 709/203; 709/218

(58) Field of Classification Search
CPC . G06F 17/30861; H04L 67/04; H04L 67/142; H04L 69/28
USPC .......... 709/203, 218; 713/153, 162, 169, 176, 713/185; 726/3
See application file for complete search history.

(56) References Cited

U.S. PATENT DOCUMENTS

| | | | |
|---|---|---|---|
| 5,261,052 | A | 11/1993 | Shimamoto et al. |
| 5,546,516 | A | 8/1996 | Austel et al. |
| 5,572,643 | A | 11/1996 | Judson |
| 5,638,513 | A | 6/1997 | Ananda |
| 5,687,235 | A | 11/1997 | Perlman et al. |

(Continued)

OTHER PUBLICATIONS 3 pages from www.statslab.cam.ac.uk entitled "Readme for analog 4.1," printed Apr. 2000.

(Continued)

*Primary Examiner* — Tonia L Dollinger
*Assistant Examiner* — Davoud Zand
(74) *Attorney, Agent, or Firm* — Robert C. Kowert; Meyertons, Hood, Kivlin, Kowert & Goetzel, P.C.

(57) ABSTRACT

A web site server is able to identify distinct users by using a unique identifier associated with each client computer system requesting access to a web site. The unique identifier comprises an Internet address, such as an Internet Protocol (IP) address, and a time value associated with each client computer system requesting access to the web site. On starting up a web browser, an application program or browser plug-in may synchronize the internal clock included with the client computer system with a global time standard. A web site server may determine the uniqueness of the client computer system by comparing unique identifier records of users accessing the web site. A user may be identified as distinct if no matching record exists in the database. Users privacy is also protected as the unique identifiers are erased when the client computer system's user exits the web browser or powers down the computer.

20 Claims, 5 Drawing Sheets

(56) References Cited

U.S. PATENT DOCUMENTS

| | | |
|---|---|---|
| 5,774,670 A | 6/1998 | Montulli |
| 5,826,242 A | 10/1998 | Montulli |
| 5,860,068 A | 1/1999 | Cook |
| 5,869,819 A | 2/1999 | Knowles et al. |
| 5,892,917 A | 4/1999 | Myerson |
| 5,907,621 A | 5/1999 | Bachman et al. |
| 5,943,478 A | 8/1999 | Aggarwal et al. |
| 5,948,061 A | 9/1999 | Merriman et al. |
| 5,956,521 A | 9/1999 | Wang |
| 5,966,705 A | 10/1999 | Koneru et al. |
| 5,970,468 A | 10/1999 | Bull |
| 5,970,475 A | 10/1999 | Barnes et al. |
| 5,974,441 A | 10/1999 | Rogers et al. |
| 5,978,817 A | 11/1999 | Giannandrea et al. |
| 5,978,828 A | 11/1999 | Greer et al. |
| 5,987,430 A | 11/1999 | Van Horne et al. |
| 5,991,735 A | 11/1999 | Gerace |
| 6,006,241 A | 12/1999 | Purnaveja et al. |
| 6,023,769 A | 2/2000 | Gonzalez |
| 6,032,184 A | 2/2000 | Cogger et al. |
| 6,035,332 A | 3/2000 | Ingrassia et al. |
| 6,041,357 A | 3/2000 | Kunzelman et al. |
| 6,085,220 A | 7/2000 | Courts et al. |
| 6,092,074 A | 7/2000 | Rodkin et al. |
| 6,092,110 A | 7/2000 | Maria et al. |
| 6,104,392 A | 8/2000 | Shaw et al. |
| 6,105,133 A | 8/2000 | Fielder et al. |
| 6,108,704 A | 8/2000 | Hutton et al. |
| 6,134,582 A | 10/2000 | Kennedy |
| 6,134,588 A | 10/2000 | Guenthner et al. |
| 6,134,592 A | 10/2000 | Montulli |
| 6,170,017 B1 | 1/2001 | Dias et al. |
| 6,175,838 B1 | 1/2001 | Papierniak et al. |
| 6,182,097 B1 | 1/2001 | Hansen et al. |
| 6,185,184 B1 | 2/2001 | Mattaway et al. |
| 6,198,824 B1 | 3/2001 | Shambroom |
| 6,223,215 B1 | 4/2001 | Hunt et al. |
| 6,226,678 B1 * | 5/2001 | Mattaway et al. ............ 709/230 |
| 6,249,803 B1 | 6/2001 | Jindal et al. |
| 6,260,062 B1 | 7/2001 | Davis et al. |
| 6,272,639 B1 | 8/2001 | Holden et al. |
| 6,282,522 B1 | 8/2001 | Davis et al. |
| 6,282,712 B1 | 8/2001 | Davis et al. |
| 6,295,541 B1 | 9/2001 | Bodnar et al. |
| 6,317,786 B1 | 11/2001 | Yamane et al. |
| 6,360,270 B1 | 3/2002 | Cherkasova et al. |
| 6,367,009 B1 | 4/2002 | Davis et al. |
| 6,374,295 B2 | 4/2002 | Farrow et al. |
| 6,418,471 B1 | 7/2002 | Shelton et al. |
| 6,421,768 B1 | 7/2002 | Purpura |
| 6,424,949 B1 | 7/2002 | Deaton et al. |
| 6,449,604 B1 | 9/2002 | Hansen et al. |
| 6,449,696 B2 | 9/2002 | Okayasu |
| 6,460,051 B1 | 10/2002 | LaRue et al. |
| 6,516,336 B1 | 2/2003 | Davis et al. |
| 6,523,064 B1 | 2/2003 | Akatsu et al. |
| 6,529,952 B1 | 3/2003 | Blumenau |
| 6,549,944 B1 | 4/2003 | Weinberg et al. |
| 6,598,077 B2 | 7/2003 | Primak et al. |
| 6,601,100 B2 | 7/2003 | Lee et al. |
| 6,606,708 B1 | 8/2003 | Devine et al. |
| 6,625,624 B1 | 9/2003 | Chen et al. |
| 6,628,314 B1 | 9/2003 | Hoyle |
| 6,643,696 B2 | 11/2003 | Davis et al. |
| 6,651,098 B1 | 11/2003 | Carroll et al. |
| 6,658,463 B1 | 12/2003 | Dillon et al. |
| 6,662,227 B2 | 12/2003 | Boyd et al. |
| 6,662,230 B1 | 12/2003 | Eichstaedt et al. |
| 6,715,082 B1 | 3/2004 | Chang et al. |
| 6,801,949 B1 | 10/2004 | Bruck et al. |
| 6,836,773 B2 | 12/2004 | Tamayo et al. |
| 6,925,442 B1 | 8/2005 | Shapira et al. |
| 6,950,933 B1 | 9/2005 | Cook et al. |
| 6,983,379 B1 | 1/2006 | Spalink et al. |
| 6,996,536 B1 | 2/2006 | Cofino et al. |
| 7,007,041 B2 | 2/2006 | Multer et al. |
| 7,076,453 B2 | 7/2006 | Jammes et al. |
| 7,093,020 B1 | 8/2006 | McCarty et al. |

OTHER PUBLICATIONS 46 pages from www.3com.com entitled "Understanding IP Addressing: Everything Your Ever Wanted to Known," (c) 2000 3Com Corporation.

* cited by examiner

| Internet address | Time value | Time stamp |
|---|---|---|
| IP000 | TV000 | TS000 |
| IP000 | TV001 | TS001 |
| IP001 | TV002 | TS002 |
| IPNNN | TVNNN | TSNNN |

Figure 5

SYSTEM AND METHOD FOR IDENTIFYING INDIVIDUAL USERS ACCESSING A WEB SITE

This application is a continuation of U.S. application Ser. No. 13/159,127, filed Jun. 13, 2011 now U.S. Pat. No. 8,095,654, which is a continuation of U.S. application Ser. No. 09/588,879, filed Jun. 6, 2000, now U.S. Pat. No. 7,962,603 which are incorporated herein by reference in their entirety.

BACKGROUND OF THE INVENTION

1. Field of the Invention

The present invention generally relates to the field of the Internet. More particularly, the present invention relates to an improved system and method for identifying unique users accessing a web site.

2. Description of the Related Art

Internet commerce has become an increasingly popular form of commerce in the United States and throughout the world. In general, Internet-based commerce, often referred to as e-commerce, provides advantages to both suppliers and consumers. E-commerce provides vendors and service providers the ability to greatly increase their sales channel and distribution network with minimal cost. An Internet commerce site provides a convenient, effective and secure mechanism for potential buyers to browse, select and purchase goods or services in an easy and simple fashion.

An important consideration for owners and/or operators of web sites, which have been designed to handle Internet commerce, is the amount of web traffic flowing through the site. There are various metrics used to measure web traffic. Various web traffic analysis and tracking software is available to provide the owners and/or operators of web sites with detailed statistics. One commonly used metric, for example, is the number of web page accesses or web hits on a page of a web site. Many Internet sites display a counter to show the number of visitors since last counter reset. The number of web hits per page, measured over a given time period, may have a significant impact on the advertising revenues generated by the web site.

Web site logs and other software designed to measure and analyze web traffic, can provide a wealth of additional information regarding the user. For example, it may include detail such as the operating system of user's computer, web browser software used to access web site, hourly/daily/weekly frequency distribution of web hits, Internet Provider (IP) address of user, country of registration for the user's Internet Service Provider (ISP), etc.

Although it has been possible to get detailed statistics referenced above, such as the number of raw hits per web site, the data collected is often incorrect, inadequate and often misleading. Up to now, it has been difficult to accurately identify and count the number of clients accessing a web site. For example, raw hit data shows the number of times each file has been requested at a web site. It can give an idea of the number of clients visiting a web site. However, it may not be able to disclose further detail. Assuming 1,000 hits were recorded on a web site, the raw hit data may not be able to report whether the hits were generated by 10 visitors racking up 100 hits a piece, or by 200 visitors creating five hits each, or by one visitor creating 1000 hits.

One prior art method to identify unique, distinct or individual users is based on the use of cookies. Cookies are identifiers placed on a user's computer system by a web site that the user may have visited. Web sites may use cookies to identify and track a user's movement through the web site. The use of cookies is thus considered an intrusive technology. Many Internet users have expressed concerns over the privacy issues related to the use of cookies. In order to protect their privacy, many users disable the use of cookies (a standard option in many of the popular web browsers). Furthermore, some types of browser software and earlier versions of popular web browsers do not support the use of cookies. Also, users can refuse cookies on a per cookie basis, or modify their local cookie file at will. As a result, it has been difficult to accurately identify and count individual users using cookies.

Another prior art method to identify individual users is to require user registration before entering a web site. This method, in many respects, is similar to the use of cookies. However, unlike cookies (which have become virtually transparent and often unknown to the user) the user must knowingly enter self-identifying information to gain access to the web site. Many Internet users have expressed concerns over the privacy issues related to the need for user registration to enter a web site, in addition to the inconvenience of remembering yet another user ID and password. As a result, it has been difficult to accurately count individual and distinct users who have not participated in user registration.

Yet another prior art method used to identify individual users is tracking Internet Provider (IP) addressed to identify users. However, larger Internet Service Providers (ISP's) such as America On-line (AOL) use a proxy server. A proxy server sits between a client application, such as a web browser, and a real web server located on the Internet. The proxy server intercepts all requests to the real server to see if the proxy can fulfill the requests itself. If not, the proxy server forwards the request to the real web server. It may be possible for hundreds or perhaps thousands of clients, such as AOL clients, to be accessing a web site simultaneously but may still show the same IP address. As a result, it has been difficult to accurately identify and count individual users who may have been assigned to the same proxy server.

For these reasons, it would be desirable to provide an improved method and system for counting individual users accessing a web site. It would be desirable for the improved method and system to use non-intrusive technology, which would address the privacy concerns of users, yet at the same time be able to identify individual users accessing a web site. It would be desirable for the improved method and system to identify and count all unique users logged on to a proxy server and accessing the web site.

SUMMARY OF THE INVENTION

The present invention provides various embodiments of an improved method and system for identifying individual users accessing a web site. The system and the method allow a web site server to identify distinct users by using a unique identifier associated with each client computer system requesting access to the web site. The unique identifier comprises an Internet address, such as the Internet Protocol (IP) address, and a time value associated with each client computer system or browser application requesting access to the web site.

On starting up a web browser on a client computer system, an application program may synchronize the internal real-time clock included with the client computer system with a global time standard. The synchronized time value included in the unique identifier may be based on an event associated with the client computer system, such as the start of a web browser. Similar time synchronization may occur on web servers.

In one embodiment, one or more records may be stored in a database. Each record comprises a unique identifier corresponding to each computer user accessing the web site. A new client computer system may request access to the web site. In response, the web site server may request the new client computer system to provide information comprising the Internet address and the time value. The new client computer system may send the requested information to the web site server. A web site server hosting the requested web site may determine the uniqueness of the client computer system by comparing unique identifier records of users accessing the web site with those stored in the database. A user may be identified as distinct if no matching record exists in the database.

In another embodiment, the user of the client computer system may request access to a web site. The initial request may include the unique identifier comprising the Internet address and the time value. A web site server hosting the requested web site may determine the uniqueness of the client computer system by comparing unique identifier records, stored in a database, of users accessing the web site. A user may be identified as distinct if no matching record exists in the database.

Advantageously, multiple client computer systems using a common Internet address may be differentiated by using this method. Furthermore, user's privacy may also be protected as the unique identifiers are erased once the client computer system's user closes the web browser or powers down the computer.

BRIEF DESCRIPTION OF THE DRAWINGS

FIG. 5 illustrates a database record for identifying distinctive computer users accessing a web site according to one embodiment.

Figure 1:
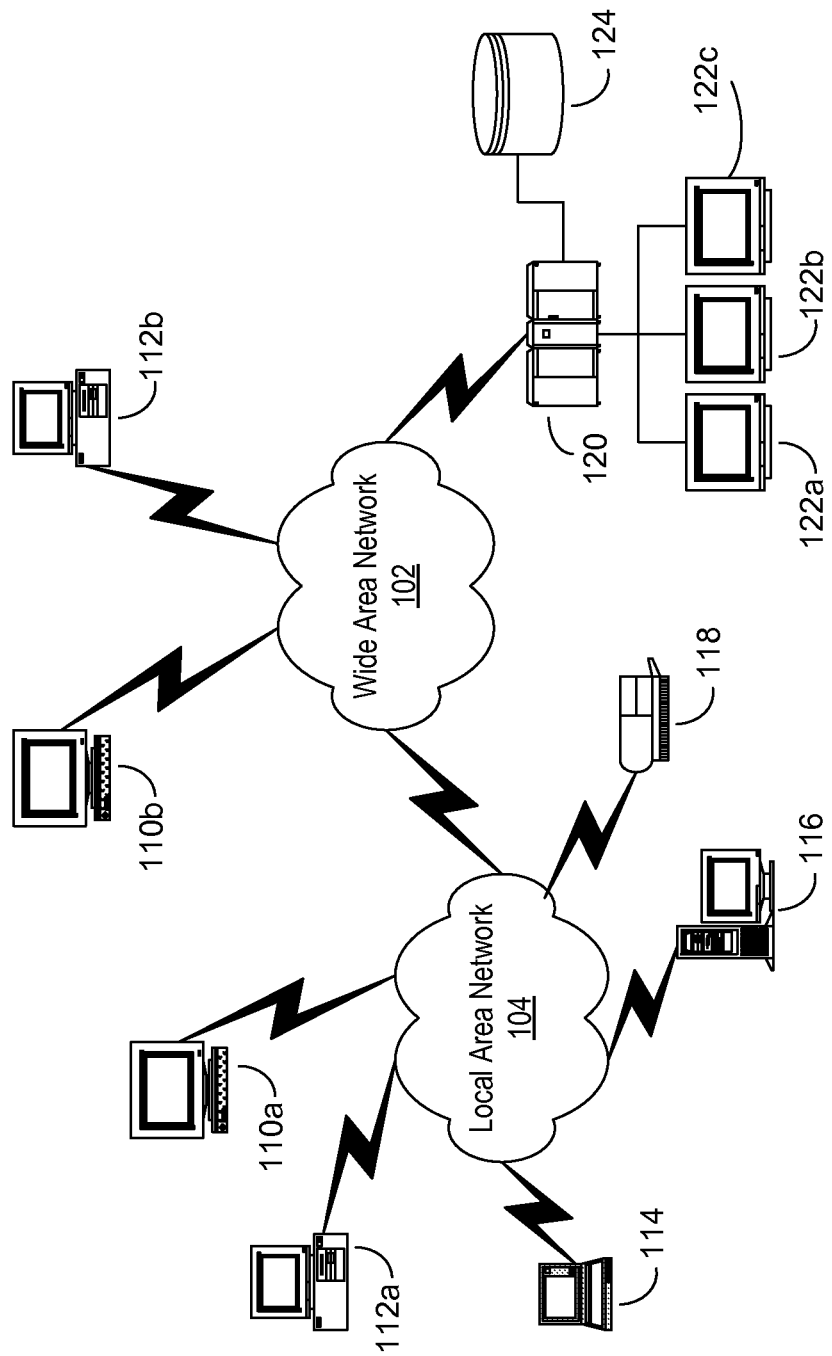
FIG. 1 is a network diagram of a wide area network, which is suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims.

DETAILED DESCRIPTION OF SEVERAL EMBODIMENTS

FIG. 1: Wide Area Network

FIG. 1 illustrates a wide area network (WAN) according to one embodiment. WAN 102 is a network that spans a relatively large geographical area. The Internet is an example of WAN 102. WAN 102 typically includes a plurality of computer systems which are interconnected through one or more networks. Although one particular configuration is shown in FIG. 1, WAN 102 may include a variety of heterogeneous computer systems and networks which are interconnected in a variety of ways and which run a variety of software applications.

One or more local area networks (LANs) 104 may be coupled to WAN 102. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves).

Each LAN 104 includes a plurality of interconnected computer systems and optionally one or more other devices: for example, one or more workstations 110a, one or more personal computers 112a, one or more laptop or notebook computer systems 114, one or more server computer systems 116, and one or more network printers 118. As illustrated in FIG. 1, an example LAN 104 may include one of each of computer systems 110a, 112a, 114, and 116, and one printer 118. The LAN 104 may be coupled to other computer systems and/or other devices and/or other LANs 104 through WAN 102. Private communication networks, often referred to as an Intranet 304a, may comprise of one or more LAN's 104 and one or more WAN's 102.

One or more mainframe computer systems 120 may be coupled to WAN 102. As shown, the mainframe 120 may be coupled to a storage device or file server 124 and mainframe terminals 122a, 122b, and 122c. The mainframe terminals 122a, 122b, and 122c may access data stored in the storage device or file server 124 coupled to or included in the mainframe computer system 120.

WAN 102 may also include computer systems, which are connected to WAN 102 individually and not through a LAN 104: as illustrated, for purposes of example, a workstation 110b and a personal computer 112b. For example, WAN 102 may include computer systems, which are geographically remote and connected to each other through the Internet or the Intranet.

Figure 2:
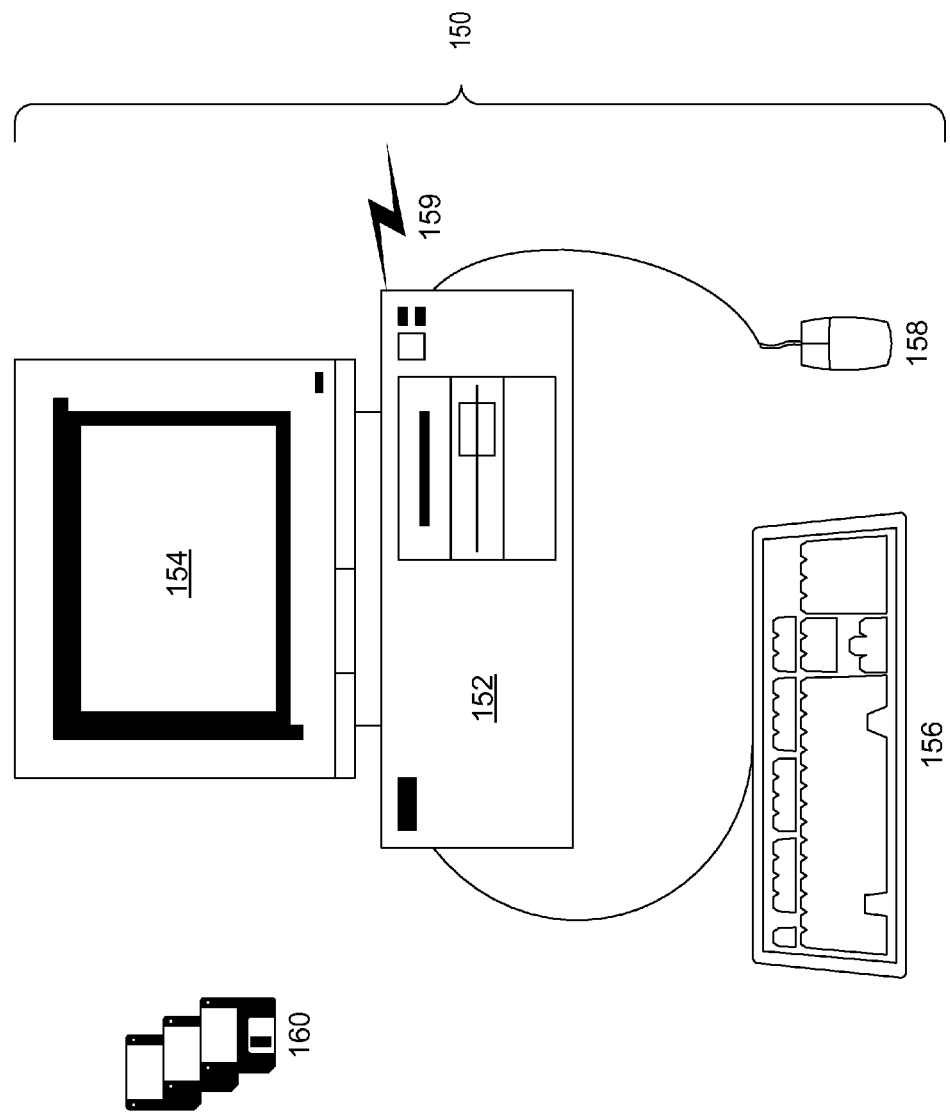
FIG. 2 is an illustration of a typical computer system, which is suitable for implementing various embodiments.

FIG. 2: Typical Computer System

FIG. 2 illustrates a typical computer system 150, which is suitable for implementing various embodiments of a system and method for identifying distinctive computer users accessing a web site. Each computer system 150 typically includes components such as a CPU 152 with an associated memory medium such as floppy disks 160, CD-ROM (not shown), etc. The memory medium may store program instructions for computer programs, wherein the program instructions are executable by the CPU 152. The computer system 150 may further include a display device such as a monitor 154, an alphanumeric input device such as a keyboard 156, communication device such as a modem 159 and a directional input device such as a mouse 158.

In one embodiment, the computer system 150 may be a client computer 306, operable by a computer user, to execute the computer programs to identify distinctive computer users accessing a web site as described herein. In another embodiment, the computer system 150 may be an e-commerce server 302 operable to execute the computer programs to identify distinctive computer users accessing a web site as described herein. Other embodiments of the computer system 150 may include, but are not limited to, a proxy server 312, a local Internet server 322, a mainframe computer, a personal computer, and several others as described herein.

The computer system 150 preferably includes a memory medium on which computer programs according to various embodiments may be stored. The term "memory medium" is intended to include an installation medium, e.g., a CD-ROM, or floppy disks 160, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. The computer system 150 may also include a time keeping device such as a real-time clock. The real-time clock of the computer system 150 may be, periodically or on demand, synchronized with a global standard time clock. Also, the computer system 150 may take various forms, including but not limited to a personal computer system, mainframe computer system, workstation, network appliance, Internet appliance, personal digital assistant (PDA), Internet enabled PDA, web television system, Internet enabled cellular telephone or any other similar device. In general, the term "computer system" can be broadly defined to encompass any device having a processor, which executes instructions from a memory medium.

The memory medium preferably stores a software program or programs for identifying distinctive computer users accessing a web site as described herein. The software program(s) may be implemented in any of various ways, including procedure-based techniques, component-based techniques, and/or object-oriented techniques, among others. For example, the software program may be implemented using ActiveX controls, programming languages such as C++, Java, VB, etc., object oriented software based on COM/DCOM and/or CORBA objects, JavaBeans, Microsoft Foundation Classes (MFC), browser-based applications (e.g., Java applets), traditional programs, or other technologies or methodologies, as desired. A CPU, such as the host CPU 152, executing code and data from the memory medium includes a means for creating and executing the software program or programs according to the methods and/or block diagrams described below.

Figure 3:
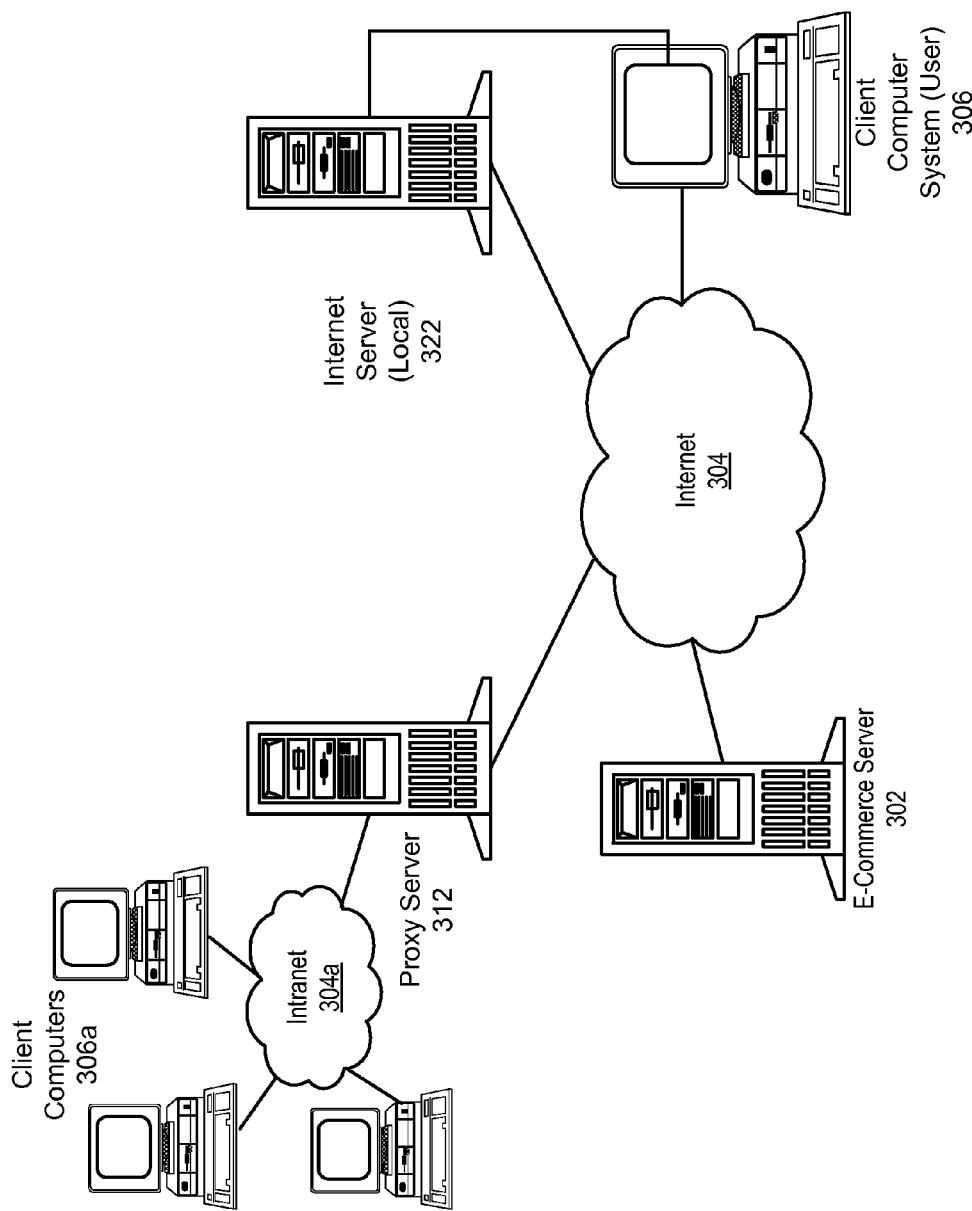
FIG. 3 illustrates an exemplary e-commerce network system for identifying distinctive computer users accessing a web site according to one embodiment.

FIG. 3: Network System for Identifying a Distinct Computer User Accessing a Web Site FIG. 3 illustrates a simplified and exemplary Internet commerce or e-commerce network system for identifying distinctive computer users accessing a web site according to one embodiment of the present invention. The system shown in FIG. 3 may utilize one or more identification techniques to identify distinct computer users in e-commerce applications.

As used herein, the term "Computer User" is intended to include any person who can operate a computer 150 to gain access to an Internet web site hosted by server 302. In one embodiment, the access to an Internet web site may be provided by a proxy server 312. As used herein, the term "web site" is intended to include all Internet 304 as well as Intranet 304a sites, including e-commerce sites and groups of non-commercial Web pages, which can be accessed by a Uniform Resource Locator (URL).

As shown, the system may include an Internet server (local) 322, a proxy server 312 and an e-commerce server 302. All three servers shown are various embodiments of the computer system 150. The e-commerce server 302 is preferably maintained by a vendor who offers goods or services over the Internet. One example of an e-commerce vendor is Amazon.com, which sells books and other items over the Internet. In one embodiment, a web site may not directly offer goods and services for sale at the web site. For example, it may be a portal site to serve as a facilitator for buyers and sellers rather than offering goods and services directly for sale on its web site. The web site may only provide information to client computer users by providing URL links to buyers and sellers. A search engine web site, as another example, may only provide links to relevant web sites or its advertisers but may not sell goods or services at its own web site.

As shown, the e-commerce server 302 may be connected to a network 104, preferably the Internet 304. The Internet 304 is currently the primary mechanism for performing electronic commerce. However, the present invention may be used with any of various types of LAN's and/or WAN's, such as the Internet 304 and/or the Intranet 304a, which connects computers and networks of computers together, thereby providing the connectivity for enabling electronic commerce to operate.

A client computer 306 may also be connected to the Internet 304 directly or via a local Internet server 322. One or more client computers 306a may be connected to the Internet 304 via a proxy server 312 and an Intranet 304a. The client computer system 306 user may launch or execute Web browser software for allowing a user of the client computer 306 i.e., a computer user, to browse and/or search the Internet 304. The client computer system 306 also enables the user to conduct e-commerce transactions over the Internet 304. For example, an e-commerce transaction may include a request for information, a purchase of a product, a payment, a service appointment request, etc. When the user of the client computer 306 desires to obtain information and/or purchase a good or service from a vendor over the Internet 304, the Web browser software preferably accesses the Web page of the respective e-commerce server, such as e-commerce server 302. The client may access the Web page of the e-commerce server 302 directly or may access the site through a proxy server 312 or some other third party like a search engine. When the client Web browser accesses the Web page of the e-commerce server 302, the e-commerce server 302 may recognize the computer user 306 as a distinct user. The web hit counter may be incremented by one for each distinct user.

The e-commerce server 302 may subsequently provide various data and information to the client browser on the client system 306, possibly including the products (goods and/or services) offered, descriptions and prices of these products, and other information that would typically be valuable to the purchaser of a product or a service. As used herein, the term "product" is intended to include various types of goods or services, such as books, CDs, content subscription services, furniture, online auction items, clothing, ISP service, consumer electronics, travel, software, medical supplies, computer systems etc., or various services such as loans (e.g., auto, mortgage, and home re-financing loans), securities (e.g., stocks, retirement accounts, bonds, and mutual funds), or insurance (e.g., life, health, auto, and home owner's insurance), among others.

The e-commerce server 302 may be operated by an e-commerce vendor, or on behalf of the e-commerce vendor by a third party company, such as a web site hosting service provider, an application service provider, etc.

FIG. 3 illustrates an exemplary embodiment including one e-commerce server 302, one client computer system 306, one proxy server 312 connected with one or more client computers 306a via Intranet 304a, and one Internet Server (Local) 322 which may be connected to the Internet 104. However, it is noted that the present invention may be utilized with respect to any number of e-commerce servers 302, proxy servers 312, and clients 306 or 306a.

This embodiment provides a number of benefits to web site hosts as well as users. First, the counting of web hits is more accurate. Users logged on through proxy servers, such as America On-line clients, would be more likely to be identified as unique users despite having the same Internet address. This may enable more accurate web hit counting. Allocation of advertising revenues may thus potentially be improved by keeping an accurate track of the number of web hits and number of unique users. Second, this embodiment may offer a safer, privacy-enhanced browsing environment to users by using a non-intrusive method for tracking distinct users. In contrast, prior art methods rely on the use of intrusive technology such as cookies, user registration, etc., and thus do not accommodate user privacy concerns.

Figure 4:
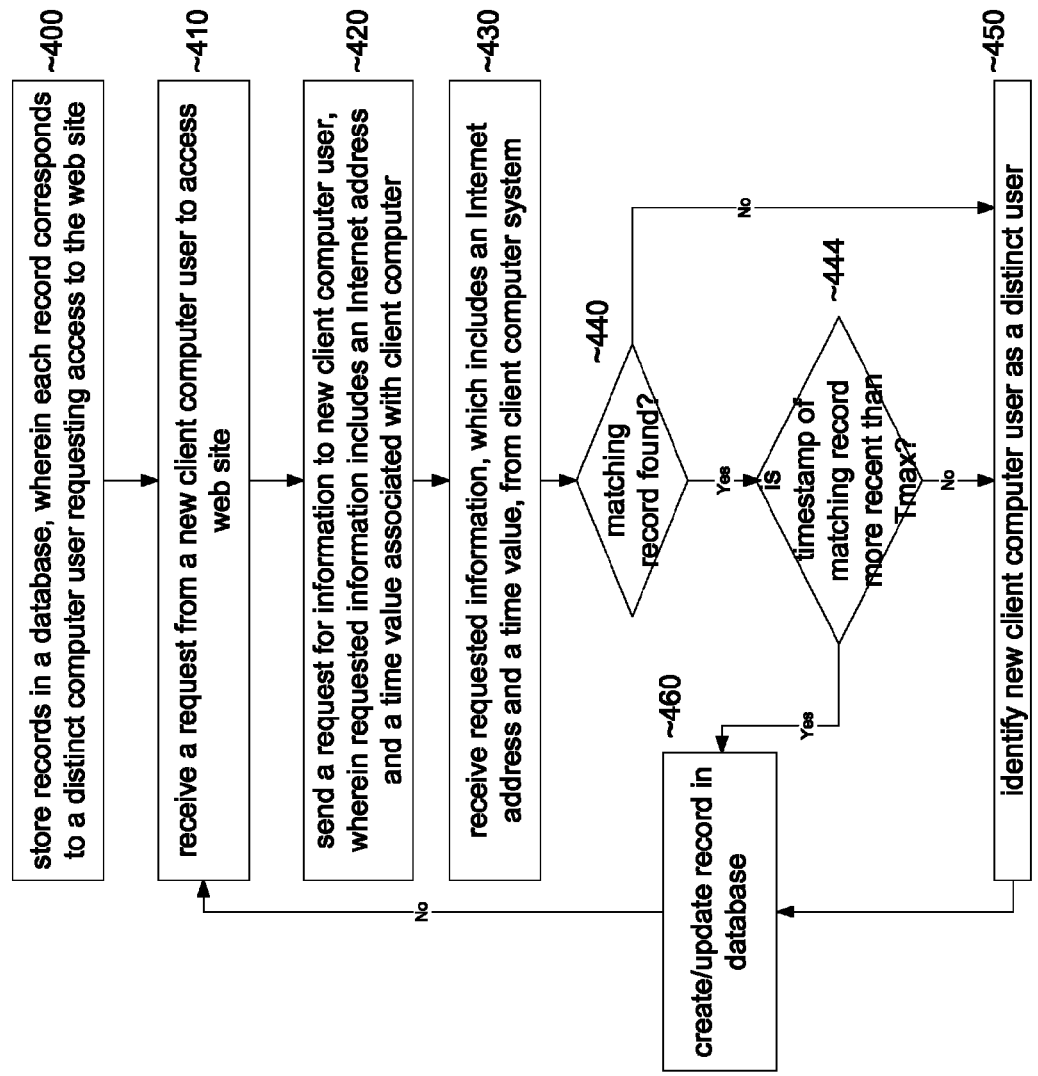
FIG. 4 illustrates a flow chart for identifying distinctive computer users accessing a web site according to one embodiment.

FIG. 4: Flow Chart for Identifying Individual Users Accessing a Web Site

FIG. 4 is a flow chart illustrating a method to identify individual users accessing a web site, according to one embodiment. In step 400, the e-commerce server 302 may store records in a database wherein each record corresponds to a distinct computer user requesting access to the web site. FIG. 5 illustrates an example of one embodiment of such a database for use in counting unique users.

Criteria for the definition and measurement of a distinct computer user may be established by various organizations such as the Internet Advertising Bureau, the web site vendor, etc. Due to the fast changing Internet technology no universally accepted definitions currently exist for widely used terms such as web hits.

Every element of a requested page (including text, graphics, and interactive items) may often be counted as a web hit. Web hits may not be the preferred unit of site-traffic measurement because the number of web hits per page varies widely. Web hits may often be confused with page views. A page view is the number of times a web page is requested. Page views, not web hits, may often be the preferred counting method for web site-traffic estimates and measurement. For example, a distinct computer user may access a web site ten times during a specified time interval of 30-minutes. One web site vendor may count those as one web hit whereas another web site vendor may count those as ten web hits. A web site vendor may establish that multiple accesses by the same user within a specified time interval (e.g. thirty minutes) may be counted as a single hit for tracking purposes.

Attributes or properties that may be associated with a distinct computer user may be specified in a variety of ways. Prior art methods, which rely on the use of cookies and/or user registration, are considered as intrusive to the privacy of the computer users. Specifying an Internet address 500 and a time value 510 associated with a distinct computer user is a unique, non-intrusive and non-persistent method to identify individual users.

The definition of the time value 510 attribute is unique for each distinct computer user accessing a web site during a specified interval of time. In one embodiment, the time value is derived from a synchronized, global time standard like the one maintained by the United States Naval Observatory or by Greenwich Mean Time (GMT). When the client computer 106 user launches a web browser to gain access to a web site, an application program or plug-in may be concurrently launched to synchronize the computer's or browser's real time clock with the global time standard. In one embodiment, the time value attribute may be specified as being associated with a unique event associated with the client computer 306.

The launch of the application program for time synchronization or the launch of the web browser software may be examples of such events. It is highly unlikely that two distinct computer users, with a common Internet address, would launch the web browser software to access the same web site at the same instant in time. As such, the combination of using the Internet address and the synchronized time value is a unique, non-intrusive method to identify individual users. Client computers 306a, which may be served by a single proxy server 312, may still be identified as distinct users since each client computer user 306a will have a unique combination of Internet address 500 and time value 510. Since web browsers may be opened and closed at-will by the user, the time value associated with each of the client computers 306a may vary and is not persistent like the cookies.

In another embodiment, in addition to the client computer synchronizing time with the global time standard, the time keeping device included with the proxy server and/or the web server hosting the web site, may also be synchronized with the global time standard. The time synchronization for servers may occur automatically based on a specified periodic time interval or may be synchronized based on an event.

In another embodiment, the time value may indicate the synchronized real-time at which the web site access request was generated. In this embodiment, it may be possible for the web site vendor to identify the approximate geographic location, relative to GMT, of the client computer user 306. Varieties of other embodiments to specify a time value 510 are also possible.

In one embodiment, each record 520 stored in the database comprises an Internet address 500, such as an Internet Protocol (IP) address, and a time value 510. In one embodiment, the time value may reflect the real-time at which the client computer's time clock was synchronized with the global time standard. Each record 520 stored in the database corresponds to a distinct computer user accessing a web site or group of web sites. The number of records included in the database will vary corresponding to the number of distinct computer users accessing a web site. The records stored in the database may be dynamically and/or automatically modified. As additional client computer 306 users seek access to the web site, new records can be added. As existing client computer users may have not visited the same web site after the initial access and within a specified time period, their corresponding record may have been deleted.

In step 410, the e-commerce server 302 receives a request from a new client computer 306 user to access the web site. In step 420, and in response to step 410, the e-commerce server 302 sends a request to the new client computer 306 user to provide information to uniquely identify itself. In one embodiment, the information includes an Internet address 500 and a time value 510 associated with the client computer 306.

In step 430, the e-commerce server 302 receives the requested information from the new client computer 306 user. In step 440, the e-commerce server 302 determines whether a matching record for the new client computer 306 user exists in the database. In one embodiment, the determination can be made by performing a query on a relational database. In another embodiment, the determination can be made by invoking a method associated with the computer user object using an object-oriented database. In step 450, if no matching record is found then the computer user is identified as distinct (e.g., an advertising counter corresponding to the number of unique hits may be incremented). If a matching record is found in the database, the matching record may be examined for a timestamp 530. In step 444, the timestamp may be compared with a predetermined maximum time Tmax. Currently no industry wide definition exists for defining Tmax. It is specified individually for each web server. However, as more web advertising related Internet standards are developed it may be possible that industry adopts a time standard Tstd for Tmax. For example, an advertiser and web site host may agree that to qualify as a unique user, the user must not have accessed the web site within the previous thirty minutes. If the last access for the user was more than Tmax (e.g., thirty minutes ago), then the user may nevertheless be counted as a unique user in step 450. Otherwise, if the unique user has accessed the web site within Tmax, then the user is not counted as a unique user. In step 460, the record is already accessing the web site and is not to be identified as distinct. Note, the terms distinct and unique are used interchangeably herein. Further note that steps 444 and 460 are optional in some embodiments. For example, in some embodiments no timestamp may be involved (i.e., once a user has accessed the system, they are not counted in step 450 until they either exit their browser or power down their computer, which leads to a new time value for the next access). In yet another embodiment, the database may simply be purged on a periodic basis (e.g., daily). During the purge process, all records may be cleared, or only records older than a predetermined time Tmax maybe purged.

In another embodiment, step 400 may be implicitly performed but may not be explicitly identified as a separate step. In yet another embodiment, steps 410, 420 and 430 may be combined into one step, wherein the e-commerce server 302 receives a request from a new client computer 306 user to access a web site. Furthermore, the initial request also includes information such as an Internet address 500 and a time value 510, which uniquely identifies the new client computer 306 user.

As illustrated above, the method to identify distinct computer users accessing a web site may also be applied in various business applications. In one embodiment, steps 400 through 450 may also be applied to illustrate a new business method for counting web hits at a web site (e.g., to track unique users for advertising revenue). In another embodiment, the above method to identify distinct computer users accessing a web site may also be extended to specifically measure hits from emerging client computer embodiments such as Internet appliances, cellular telephones with a browser or wireless PDA's.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method comprising:
   receiving, from a first computer:
      a request to access a web site, and
      a first Internet address and a first time value corresponding to said first computer;
   determining whether a matching record for said first Internet address and said first time value exists in a database; and
   identifying said first computer as a distinct user if said matching record does not exist in said database.

2. The method of claim 1, wherein said first time value is associated with a user-defined event.

3. The method of claim 2, wherein said user-defined event is a launch of a web browser software on said first computer.

4. The method of claim 1, wherein said first time value is generated by a time keeping device, wherein said time keeping device is configured to synchronize said first time value with a global time keeping standard clock.

5. The method of claim 1, wherein said first Internet address is an Internet Protocol (IP) address.

6. The method of claim 1, wherein the database is an object oriented database or a relational database.

7. The method of claim 1, wherein said first computer is a personal computer, a laptop computer, a notebook computer, an Internet-enabled cellular phone, an Internet-enabled personal digital assistant, or an Internet-enabled television.

8. A system, comprising:
   a web site server computer system;
   wherein the web site server is operable to:
      receive from a first computer:
         a request to access the web site, and
         a first Internet address and a first time value corresponding to said first computer;
      determine whether a matching record for said first Internet address and said first time value exists in a database; and
      identify said first computer as a distinct user if said matching record does not exist in said database.

9. The system of claim 8, wherein said first time value is associated with a user-defined event.

10. The system of claim 9, wherein said user-defined event is a launch of a web browser software on said first computer.

11. The system of claim 8, wherein said first time value is generated by a time keeping device, wherein said time keeping device is configured to synchronize said first time value with a global time keeping standard clock.

12. The system of claim 8, wherein said first Internet address is an Internet Protocol (IP) address.

13. The system of claim 8, wherein the database is an object oriented database or a relational database.

14. The system of claim 8, wherein said first computer is a personal computer, a laptop computer, a notebook computer, an Internet-enabled cellular phone, an Internet-enabled personal digital assistant, or an Internet-enabled television.

15. A non-transitory memory medium, comprising program instructions, wherein the program instructions are executable by a computer system to implement a method of:
   receiving, from a first computer:
      a request to access a web site, and
      a first Internet address and a first time value corresponding to said first computer;
   determining whether a matching record for said first Internet address and said first time value exists in a database; and
   identifying said first computer as a distinct user if said matching record does not exist in said database.

16. The memory medium of claim 15, wherein said first time value is associated with a user-defined event.

17. The memory medium of claim 16, wherein said user-defined event is a launch of a web browser software on said first computer.

18. The memory medium of claim 15, wherein said first time value is generated by a time keeping device, wherein said time keeping device is configured to synchronize said first time value with a global time keeping standard clock.

19. The memory medium of claim 15, wherein said first Internet address is an Internet Protocol (IP) address.

20. The memory medium of claim 15, wherein the database is an object oriented database or a relational database.

* * * * *